(12) United States Patent
Powell et al.

(10) Patent No.: US 7,175,824 B2
(45) Date of Patent: Feb. 13, 2007

(54) MANUFACTURE OF HIGH-STRENGTH, LOW-SALT SODIUM HYPOCHLORITE BLEACH

(75) Inventors: Duane J Powell, Alma, MI (US); Robert B. Bebow, Alma, MI (US); Brent J. Hardman, St. Louis, MI (US)

(73) Assignee: Powell Technologies LLC a Michigan Limited Liability Company, St. Louis, MI (US)

( * ) Notice: Subject to any disclaimer, the term of this patent is extended or adjusted under 35 U.S.C. 154(b) by 0 days.

(21) Appl. No.: 11/178,580

(22) Filed: Jul. 11, 2005

(65) Prior Publication Data

US 2006/0008409 A1    Jan. 12, 2006

Related U.S. Application Data

(60) Provisional application No. 60/587,102, filed on Jul. 12, 2004.

(51) Int. Cl.
    *C01B 11/06* (2006.01)
(52) U.S. Cl. .................................. 423/473; 252/187.26
(58) Field of Classification Search ................ 423/473, 423/472; 252/187.26
    See application file for complete search history.

(56) References Cited

U.S. PATENT DOCUMENTS

| | | | |
|---|---|---|---|
| 3,287,233 A * | 11/1966 | Aigueperse et al. ... | 252/187.26 |
| 4,330,521 A * | 5/1982 | Glineur ..................... | 423/473 |
| 4,428,918 A | 1/1984 | Verlaeten et al. | |
| 4,780,303 A | 10/1988 | Dugua | |
| 5,116,594 A * | 5/1992 | Hilliard et al. ............. | 423/473 |
| 5,194,238 A | 3/1993 | Duncan et al. | |
| 5,961,879 A * | 10/1999 | Trigiante ............... | 252/187.25 |

FOREIGN PATENT DOCUMENTS

| | | |
|---|---|---|
| JP | 72-15463 | 5/1972 |
| JP | 54118398 | 9/1979 |
| JP | 79118398 | 9/1979 |
| JP | 59008603 | 1/1984 |
| JP | 62270406 | 11/1987 |
| JP | 11021105 | 1/1999 |
| JP | 11060204 | 3/1999 |
| JP | 11255503 | 9/1999 |

* cited by examiner

*Primary Examiner*—Ngoc-Yen Nguyen
(74) *Attorney, Agent, or Firm*—George L. Boller

(57) ABSTRACT

A process and apparatus for the manufacture of high-strength, low-salt sodium hypochlorite. An aqueous solution that comprises certain weight percentages of sodium hypochlorite and sodium hydroxide and that is essentially free of sodium chloride (salt) crystals, an aqueous solution that comprises a certain weight percentage of sodium hydroxide, and chlorine in gas and/or liquid phase that may or may not include inerts are reacted in a tank. This creates a solution having a precipitation zone where salt crystals are precipitating out of solution and falling downward to form a slurry, some of which is withdrawn, then cooled, and then re-introduced into the precipitation zone. Above the precipitation zone is a crystal-free mother liquor zone consisting essentially of crystal-free mother liquor containing a weight percentage of sodium hypochlorite greater than that of than the lower strength aqueous sodium hypochlorite bleach being reacted.

11 Claims, 2 Drawing Sheets

LOW SALT BLEACH PROCESS DIAGRAM

MANUFACTURE OF HIGH-STRENGTH, LOW-SALT SODIUM HYPOCHLORITE BLEACH

REFERENCE TO A RELATED APPLICATION AND PRIORITY CLAIM

This application claims the priority of Provisional Application No. 60/587,102, filed on 12 Jul. 2004 in the name of DUANE POWELL et al.

FIELD OF THE INVENTION

This invention relates to the manufacture of sodium hypochlorite bleach, in particular a process and a plant for the manufacture of sodium hypochlorite bleach.

BACKGROUND OF THE INVENTION

Bleach (sodium hypochlorite) is a commodity chemical that is used in numerous applications. The basic chemistry for manufacturing bleach is a matter of common knowledge in the fields of chemistry and chemical engineering. Chlorine in gas and/or liquid phase is allowed to react with a solution of sodium hydroxide (caustic) to yield aqueous sodium hypochlorite. While that basic chemistry may be considered rather elementary, and essentially common to all processes for the commercial manufacture of bleach, specific processes that have been described in patent literature differ in significant ways.

Each of the various known processes for the commercial manufacture of bleach may be characterized as either a batch (discontinuous) production process or a continuous production process. Each type of process may have its own particular advantages.

A continuous process that is properly controlled is more likely to be performed with higher production efficiency than a corresponding batch process, and hence is likely to be more economical than a batch process. However, the specific manner in which a continuous process is performed plays a significant role in the nature and quality of the resulting bleach product.

U.S. Pat. Nos. 4,428,918 and 4,780,303 each describes a respective continuous process for manufacture of concentrated (i.e. high-strength) sodium hypochlorite solutions. Sodium chloride (salt) is however also a product of the basic reaction, and its removal from the aqueous sodium hypochlorite product can improve both the continuous process and the resulting product. Neither of those processes removes all of the salt from the resulting product.

U.S. Pat. No. 4,428,918 describes the resulting product as an aqueous solution of sodium hypochlorite that is recovered at an hourly rate of 1775 kg. (kilograms) and that contains 257 g. (grams) of sodium hypochlorite and 94 g. dissolved sodium chloride per kg. of product. The process is said to create a suspension from which some salt is removed by a filtration apparatus through which an hourly fraction of 2051 kg. of the suspension is circulated. It is from that filtration apparatus that the aqueous solution of sodium hypochlorite is recovered, and it is said that the filtration apparatus separates out a cake containing, by weight, 80.1% sodium chloride and 19.9% sodium hypochlorite. The patent does not mention the presence of any sodium chlorate or excess caustic in the resulting sodium hypochlorite product.

U.S. Pat. No. 4,428,918 also does not quantify salt crystal size in the suspension, but it does observe that the economical removal of fine salt crystals is difficult. Crystal size is said to be increased by a recycling of the suspension through a heat exchanger that cools the suspension. It is also said that a point is eventually reached where further increases in crystal size are not obtained. The suspension is understood to exist throughout the column where crystallization is occurring and hence, there would be no zone of essentially crystal-free mother liquor.

U.S. Pat. No. 4,780,303 describes a continuous process where salt is crystallized from the suspension in what is described as a second stage, or crystallizer. A solution, that is obtained from a first stage and said to contain 14.5% sodium hypochlorite and 3.2% sodium hydroxide, is introduced into the second stage where it is reacted with chlorine to create an aqueous solution of sodium hypochlorite with salt present both in solution and suspension. The solution is subjected to mechanical agitation within the crystallizer while solution is being withdrawn from the top of the crystallizer, recirculated through an external heat exchanger, and re-introduced into the bottom of the crystallizer. A fraction of the solution that is drawn off from the top of the crystallizer is diverted from the heat exchanger to form the resulting bleach product which is said to comprise 25% sodium hypochlorite, 9.5% sodium chloride, and a slight excess of caustic (0.3%–0.8% by weight).

It is also said that no salt is precipitated in the first stage where chlorine is reacted with a caustic solution to create the solution introduced into the second stage. Crystallized salt is said to be removed from the second stage by precipitation, either continuously or intermittently, and is said to have a mean crystal size in the neighborhood of 400 microns (about 400 to 500 microns). The slight excess caustic is said to avoid the formation of sodium chlorate ($NaClO_3$), but the patent is silent about any amount of sodium chlorate that the bleach product might actually contain.

Because U.S. Pat. No. 4,780,303 requires agitating the contents of the crystallizer to promote reaction, it would be understood that the solution drawn off from the top of the crystallizer would not be free of salt crystals.

Both patents recognize that certain batch processes can produce aqueous high-strength bleach from which significant amounts of salt have been removed. Various batch processes are referenced by cited patents, both domestic and foreign.

It is believed that a continuous process that is capable of consistently producing aqueous high-strength bleach with low concentrations of both sodium chloride and sodium chlorate with residual slight excess caustic would be beneficial to industry. A product that has even greater strength, and lower salt and chlorate concentrations, than those mentioned in U.S. Pat. Nos. 4,428,918 and 4,780,303 would be especially beneficial. The benefits reside both in the utility of the product and relevant economic factors.

SUMMARY OF THE INVENTION

The present invention relates to such a process, to apparatus that produces bleach by such a process, and to the resulting high-strength, low-salt bleach product.

The high-strength, low salt bleach produced by the inventive process and apparatus, when diluted to a lower strength comparable with typical domestic commercial bleaches, has improved stability, and hence extended half-life when compared to such bleaches.

Briefly, an example of apparatus that embodies principles of the invention comprises a stage that comprises a tank or vessel into which are introduced:

1) an aqueous solution that comprises certain weight percentages of sodium hypochlorite and sodium hydroxide and that is essentially free of sodium chloride (salt) crystals;
2) an aqueous solution that comprises a certain weight percentage of sodium hydroxide; and
3) chlorine in gas and/or liquid phase that may or may not include inerts.

For convenience, this stage may sometimes be referred to as a crystallizer stage.

The aqueous solution of sodium hypochlorite and sodium hydroxide mentioned above may be produced in any suitably appropriate manner either in the same facility, such as in a prior stage, or it may be manufactured elsewhere and delivered to the facility. For convenience, such a prior stage may sometimes be referred to as a preliminary stage. Being prior to the crystallizer stage, the preliminary stage may also sometimes be referred to as the first stage, in which case the crystallizer stage may sometimes be referred to as the second stage.

A preferred process for the first stage comprises a continuous process that produces an aqueous solution containing sodium hypochlorite greater than 15% by weight without the precipitation of sodium chloride and with slight excess caustic, at least 0.5% by weight, but preferably somewhat higher. The solution is produced by introducing chlorine, in liquid and/or gas phase, wet or dry, with or without inerts, and caustic (sodium hydroxide) of sufficient strength into the first stage. If dilution of the sodium hydroxide is required, water should be used.

If the caustic that is introduced into the first stage tank has a strength of at least 24%, the liquid product of the first stage will exceed 15% by weight sodium hypochlorite (NaOCl) and 4.5% by weight sodium hydroxide (NaOH). Hence, the use of first stage caustic of at least 24% strength is significant to certain of the inventive principles disclosed here, although more general principles of the invention do not necessarily require that the caustic have that high a strength. For example, certain bleaches whose compositions are the same as those of the inventive high-strength, low-salt bleach products (whose characteristics will be described below) produced by preferred practices of the inventive process, can be produced in processes where first stage caustic feed strength is to some extent less than 24%.

The inventive high-strength, low-salt bleach products are those which comprise an aqueous solution of greater than 25% by weight sodium hypochlorite and a ratio, on a % weight basis, of NaCl (salt) to NaOCl (sodium hypochlorite), less than substantially 0.38, with a slight excess of sodium hydroxide (caustic). After removal of solids, a bleach having approximately 30% by weight sodium hypochlorite and a NaCl/NaOCl ratio of about 0.21 to about 0.25, with slight excess caustic, is one example of the inventive high-strength, low-salt bleach products disclosed here.

The total effective weight percent of caustic used to produce the bleach is greater than 33% by weight when the first stage sodium hydroxide is added to the second stage sodium hydroxide on a weight percent basis without chlorine addition in either stage. This is the weight percent of caustic in solution if no chlorine is added in either the first stage or second stage. The greater than 33% sodium hydroxide, when chlorinated to the end point of greater than 25% by weight sodium hypochlorite with a slight excess of caustic, would yield less than 9.5% NaCl if the process could be done in one stage with the same end result and all precipitated salt removed from the solution after chlorination of the caustic. Temperature of either stage can exceed 30° C. However, by controlling second stage temperature to about 30° C., it will be seen that cooling tower water can be used to advantage in one preferred practice of the inventive process using certain types of heat exchangers. Principles of the invention however also contemplate the use of tempered or chilled water in another preferred practice for certain other types of heat exchangers.

The solution from the first stage tank, a solution of caustic in an amount within a range of about 45% to about 51% caustic by weight (48% to 51% is preferred), and chlorine are fed into the second stage in which certain equipment is arranged to form a surface cooled crystallizer. A surface cooled crystallizer is any system that provides sufficient retention time, supersaturation, and cooling of chemical processes to achieve crystalline growth. The two solutions are added separately to the second stage to prevent the formation of hydrates. The chlorine can be liquid and/or gas, wet or dry, with or without inerts. The percentage of excess caustic in solution is controlled in any suitable manner using an appropriate measurement, such as redox measurement, by a commercially available piece of equipment.

A heat exchanger is one piece of equipment that is associated with the second stage tank. The heats of solution and reaction are removed from the solution in the second stage tank by recycling the solution through that heat exchanger. By using a high recycle rate through the heat exchanger, the temperature drop between the recycle outlet from the tank and the recycle return to the tank can be kept small, and thereby control the crystallization of salt within the tank in a desired way while avoiding fouling of the heat exchanger. The use of a high recycle rate for keeping that temperature drop small so that salt crystal formation is controlled in a particular way is another aspect of the invention. A temperature drop within a range from about 1° F. to about 4° F. would be typical, with a range from about 1° F. to about 2° F. being most preferable.

In order to control the temperature drop to within such a range, the heat exchanger is one that has sufficient heat transfer surface area in relation to the flow rates of the respective liquids passing through it and that presents low restriction to the flows. By suitable control of chemical processes in the crystallizer stage, the temperature of those processes can be kept within a range that allows cooling tower water to be used as the cooling liquid in certain types of heat exchangers, a further aspect of the invention that avoids the need to use more expensive refrigerated water. Principles of the invention do however also contemplate the use of refrigerated or chilled water for certain other types of heat exchangers.

A further aspect of the invention involves controlling the temperature difference between the recycle solution and the cooling liquid passing through the heat exchanger. A target range of temperature differences that avoids fouling of the heat exchanger depends on the design of the particular heat exchanger. For a plate and frame type heat exchanger, the temperature difference may have a range of from about 2° F. to about 3° F. The temperature difference may have a larger range, 5° F.–15° F. for example, for other heat exchangers, such as a shell and tube type when used with a Swenson surface cooled crystallizer.

The inventive process forms an essentially crystal-free mother liquor proximate the top of the crystallizer stage tank and a salt slurry proximate the bottom. As fresh solutions of bleach and caustic are continuously fed into the tank, the slurry at the bottom is being continually pumped out while the mother liquor rises based on total inflows to and outflows from the tank. The level to which the mother liquor rises is controlled, or regulated, either to allow or to disallow mother liquor from overflowing. When the mother liquor is allowed to overflow, the overflow is collected as high-strength, low-salt bleach.

A skirt baffle, inside the cylindrical sidewall of the crystallizer stage tank forms a cylindrical wall that creates an annular calming zone between the skirt baffle and the tank sidewall. The annular calming zone has an upper zone of crystal-free mother liquor and a lower zone where salt is precipitating and falling down. The skirt baffle surrounds a central inner zone. The annular calming zone is essentially free of turbulence, especially at the top. By continually overflowing mother liquor at an appropriate rate, salt precipitates within the lower zone, and without turbulence in that zone, falls downward, adding to the slurry and supersaturating the remaining solution, thereby promoting crystal formation and growth in the solution.

Because of the nature of the inventive process, mother liquor does not necessarily have to be drawn off from, or overflow, the upper zone to cause crystallization of salt, but the resulting crystal sizes may be generally smaller than when mother liquor is drawn off to supersaturate the remaining solution. Certain process control conditions for the inventive process can create salt concentrations sufficiently large to cause crystallization without the necessity of drawing off any mother liquor.

As a consequence of surface cooling provided by the crystallizer stage, with or without drawing off mother liquor, salt is continually crystallizing out of solution in the crystallizer tank and falling downward to continually replenish the slurry at the bottom of the tank.

The process is conducted in such a manner that the surface cooling of crystallized salt in solution promotes crystal growth. The resulting increase in crystal size aids in separation of the crystals both as they fall through solution in the tank to form the slurry at the bottom and in subsequent recovery by separation from the slurry later in the process. The resulting distribution of salt crystal sizes in the slurry renders them well-suited for ultimate recovery as essentially dry solids, a still further aspect of the invention. Recovery is performed by processing the salt slurry in a continuous manner using what are essentially mechanical processes.

The slurry from the crystallizer stage is continually introduced into a pre-thickening tank where the slurry is mechanically agitated, either by a mixer and/or by air under pressure blowing through it. At the same time, slurry is being continually pumped from the pre-thickening tank to a pre-thickening device such as a hydrocyclone, static thickener, or curved screen that removes more liquid, or filtrate. This filtrate from the pre-thickening device is recycled to the pre-thickening tank behind a baffle inside the tank to avoid any substantial disturbance of the slurry in the tank.

The more fully thickened slurry from the pre-thickening device is then fed into a centrifuge that removes almost all of the remaining liquid, yielding a product that is about 98% salt and about 2% liquid.

A preferred centrifuge is a two-stage centrifuge that allows the product to be washed with water for removing residual hypochlorite from the final salt product. Filtrate from the first stage of the centrifuge is returned to the pre-thickening tank.

The high-strength, low-salt bleach product produced by the inventive process is liquid that overflows the pre-thickening tank proximate the top of the pre-thickening tank. Because it has substantially the same composition as the high-strength, low-salt bleach product overflowing the pre-thickening tank, any mother liquor overflow from the tank of the crystallizer stage can be added to the high-strength, low-salt bleach product overflowing the pre-thickening tank. The point of overflow in the pre-thickening tank is separated from the slurry in the tank by an intervening internal wall or baffle, such as the one behind which the recycled filtrate from the pre-thickening device is introduced, to prevent salt crystals from entraining with the overflow liquid.

The high-strength, low-salt bleach product produced by the inventive process has a bleach strength greater than 25% by weight. The specific strength of a particular bleach product may be limited by decomposition issues during the production process and size of salt crystals precipitated, especially as bleach strength nears its upper limit, which as a practical matter is about 35%.

BRIEF DESCRIPTION OF THE DRAWINGS ILLUSTRATING PRACTICE OF THE INVENTIVE PROCESS

DESCRIPTION OF THE INVENTIVE PROCESS AND EQUIPMENT

Figure 1:
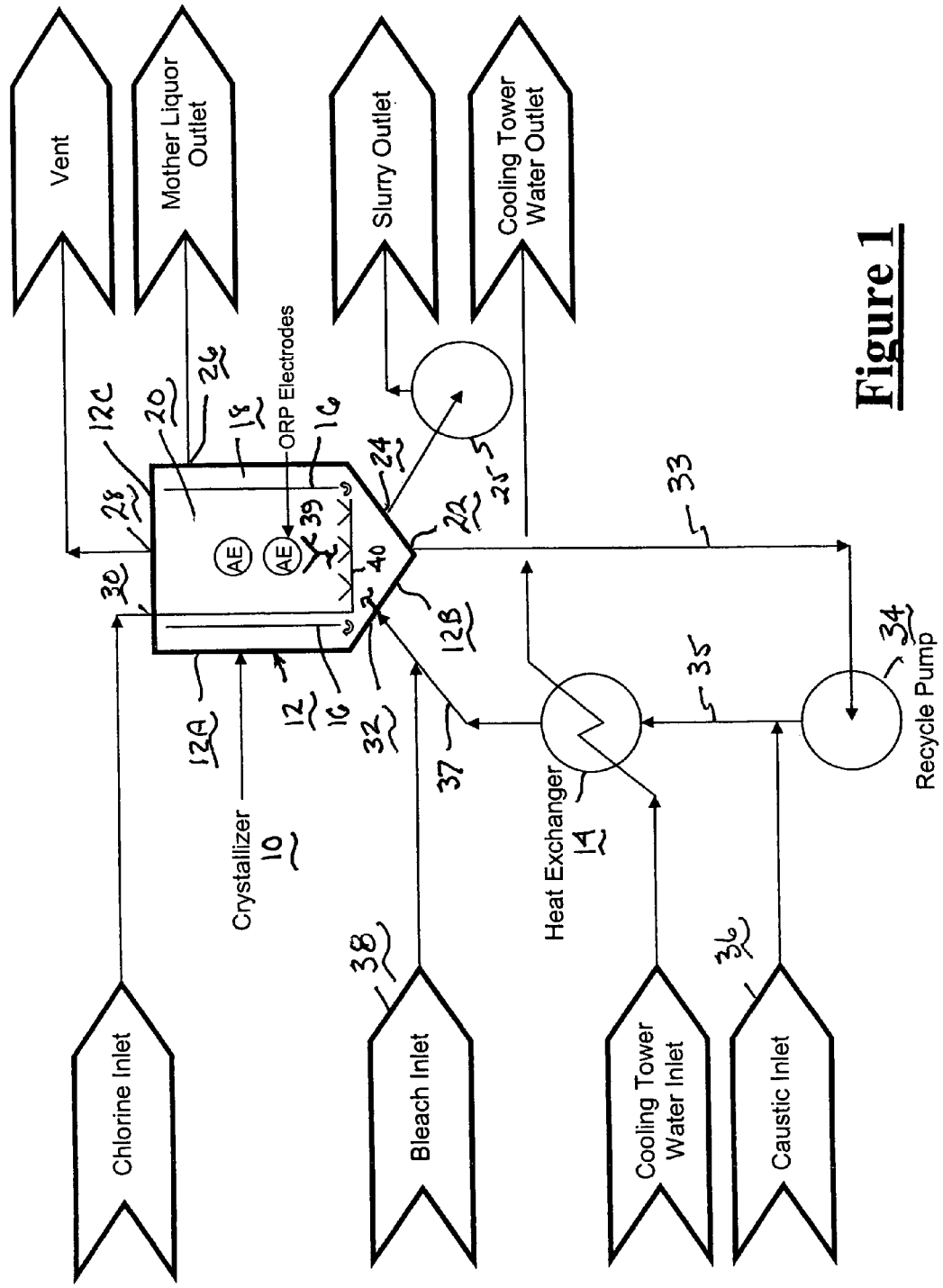
FIG. 1 illustrates schematically an example of the surface-cooled crystallizer stage that has been described above.

The stage shown in FIG. 1 comprises a surface-cooled crystallizer 10 that comprises a tank 12 with which a heat exchanger 14 is associated, as described above. The drawing does not show a first stage like the one described above, but the description of the drawings will proceed on the assumption that one is present, although it is to be appreciated that the lower strength bleach that is introduced into the crystallizer could have been manufactured elsewhere by similar processes and shipped for use in the crystallizer. Tank 12 comprises a cylindrical sidewall 12A, a conical bottom wall 12B, and a top wall 12C. A cylindrical walled skirt baffle 16 is supported in any suitable manner within the tank to cooperate with sidewall 12A in forming an outer annular calming zone 18 that is open at the bottom. Skirt baffle 16 surrounds an inner central zone 20.

This crystallizer stage has various inlets to and outlets from tank 12. A recycle outlet 22 is at or near the center low point of conical bottom wall 12B. A slurry outlet 24 is at any appropriate location. Although the drawing shows the location at a lower elevation than the bottom of zone 18, precise location is generally not critical. The outlet may even be at an end of a pipe that penetrates and extends into the interior of the tank beyond the tank wall or via a pipe that tees into a conduit 33. A mother liquor, or product, outlet 26 is proximate the top of zone 18, but at an elevation below that of the top edge of skirt baffle 16. A vent outlet 28 provides an escape for any residual chlorine gases and inert gases to a standard commercial chlorine scrubber (not specifically shown).

The two inlets to tank 12 are a chlorine inlet 30 and a recycle inlet 32. A recycle pump 34 draws liquid from the bottom of the tank through outlet 22 and conduit 33 that leads to the suction side of the pump. The pump pumps the liquid through a conduit 35 leading from the pump outlet to heat exchanger 14. Fresh caustic is added to the recycle solution through a caustic inlet 36 into conduit 35 between pump 34 and heat exchanger 14. Bleach from the first stage of the process is added through a bleach inlet 38 into a conduit 37 extending from heat exchanger 14 to recycle inlet 32. Although the illustrated apparatus shows the tank having a single inlet through which a mixture of bleach, fresh caustic and recycle solution are introduced, other plumbing arrangements may be used for allowing separate introduction at different locations, consistent with avoiding disturbance in the calming zone.

The recycle solution, as appropriately supplemented by controlled additions of fresh caustic and first-stage bleach, is introduced back into tank 12 through recycle inlet 32. The actual location at which recycle solution is introduced into solution already in the tank is at any suitable location that does not create turbulence in annular zone 18. The drawing shows a location within inner zone 20, preferably at a central location somewhat above the bottom of the zone, where the recycle solution discharges through an upright funnel 39 of increasing diameter to promote good distribution of recycle solution within that zone without creating turbulence in zone 18.

Chlorine passing through inlet 30 is conveyed to a distribution system 40 that is proximate the bottom of inner zone 20 and arranged to direct chlorine upward into the liquid in zone 20 creating additional reaction primarily within zone 20 with solution that is being continually introduced through funnel 39.

With the slurry resulting from the continuous reaction of chlorine and caustic within tank 12 having a density that keeps it toward the bottom of the tank and with the salt that is being crystallized falling down into the slurry, mother liquor at the top of the calming zone, that may or may not be withdrawn from the tank through outlet 26, possesses a composition essentially the same as the inventive composition of constituents described above.

Figure 2:
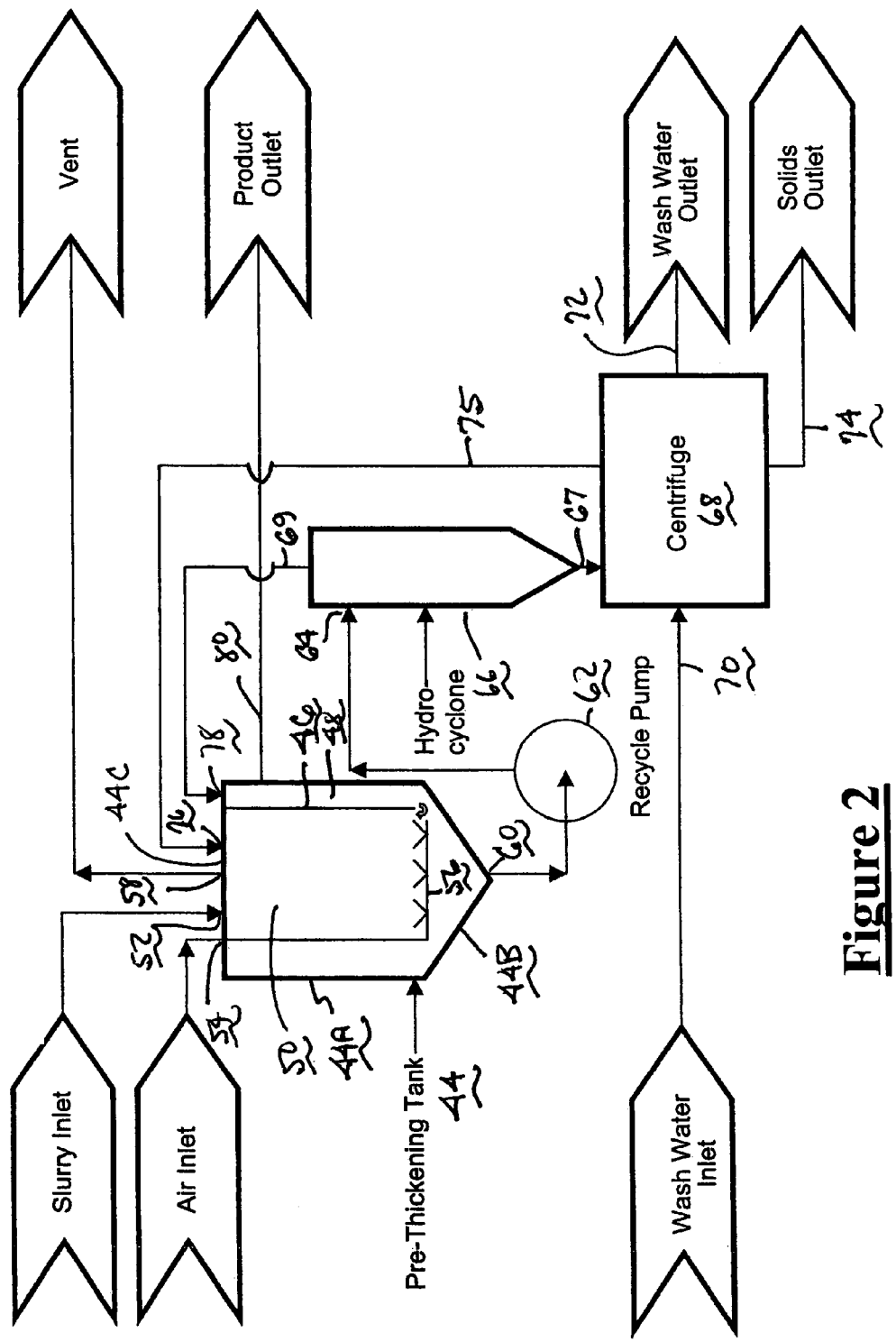
FIG. 2 illustrates schematically an example of processing subsequent to the crystallizer stage.

The continuous process further involves drawing slurry from tank through outlet 24 by pumping it out via a pump 25 for subsequent processing in accordance with FIG. 2. Although the drawing shows outlet 24 located at wall 12B, the outlet could, as mentioned above, be at any appropriate location, including a tee into conduit 33.

The rate of heat liberated by chemical processes occurring in the crystallizer stage is a function of the throughput through the crystallizer. Consequently, the recycle rate and the cooling liquid rate through the heat exchanger are controlled in relation to the crystallizer throughput so as to maintain both the small temperature drop in the recycle solution as it passes through the heat exchanger and a temperature difference between the recycle solution and the cooling liquid appropriate for the particular type of heat exchanger used, as mentioned above. It is in that context that the process is said to have a high recycle rate.

FIG. 2 shows additional equipment that includes a pre-thickening tank 44 that is similar to tank 12 in that it has a sidewall 44A, a bottom wall 44B, and a top wall 44C. It also has an internal baffle 46, creating an outer zone 48 between itself and sidewall 44A and an inner zone 50 toward the opposite side of itself. Baffle 46 need not be a full skirt.

Slurry from tank 12 is introduced into zone 50 through a slurry inlet 52. Agitation of the slurry within zone 50 is performed, for example, by the use of air pressure. Air under pressure is supplied through an air inlet 54 to a distribution system 56 that is proximate the bottom of inner zone 50 and arranged to direct the air upward into the slurry in zone 50. The air and any entrained gases are vented through a vent outlet 58 in top wall 44C over zone 50. A mechanical agitator may be used in lieu of, or in conjunction with, air sparging.

The slurry tends to fall to the bottom of the tank where it is pumped out through a slurry outlet 60 by a recycle pump 62. The pumped slurry is conveyed to an inlet 64 of a hydrocyclone 66 that operates to remove more liquid from the slurry, increasing the concentration of the solution in the slurry passing through a conduit 67 from hydrocyclone 66 to a centrifuge 68 that is used for recovery of crystallized salt by centrifuging the slurry.

A preferred centrifuge is a two-stage centrifuge that allows the product to be washed after passing through a first centrifuge stage with the washed product then being centrifuged in a second stage. Water is an example of one fluid that may be used for washing. Hence FIG. 2 shows a wash water inlet 70 and a wash water outlet 72. Washing the product removes hypochlorite from the final salt product that is delivered from the centrifuge at a solids outlet 74. Filtrate from the first stage of centrifuge 68 is returned through a conduit 75 to pre-thickening tank 44 at a first filtrate return inlet 76, and filtrate from hydrocyclone 66 is returned through a conduit 69 via a second filtrate return inlet 78. A product outlet 80 is proximate the top of zone 48. Liquid that is withdrawn through outlet 80 is substantially the same composition as the liquid bleach product that was withdrawn from tank 12 through outlet 26, meaning it has greater than 25% by weight sodium hypochlorite and less than 9.5% by weight salt (sodium chloride). The respective rates of withdrawal may differ. For example, the rate from outlet 80 may be on the order of four to six times the rate from outlet 26. The rates may vary widely based on residence times, temperatures, and concentrations, and as explained above, there might even be no withdrawal of mother liquor through outlet 26.

The inventive bleach product will contain some amount of sodium hypochlorate. That amount is to some extent a function of the reaction temperature. In general a lower reaction temperature will result in lower chlorate concentration. Consequently, certain principles of the inventive process apply to plants that use refrigerated water, as opposed to cooling tower water, in order to enable the reaction temperature to be lower. On the other hand, the high strength of the bleach product produced by the inventive process allows for its dilution by the addition of water, and while that will necessarily reduce bleach strength, it will also be effective in reducing chlorate concentration.

Potassium hydroxide can be substituted for sodium hydroxide to produce potassium hypochlorite in a similar manner.

Although reference has been made to a first stage of the process that makes a liquid bleach product having more than 15% by weight sodium hypochlorite (NaOCl) and 4.5% by weight sodium hydroxide (NaOH), generic principles of the invention contemplate that lower strength bleaches, or concentrated bleaches that have been diluted, can be used, even if made elsewhere. But in a facility that does have such a first stage for making bleach that is reacted in the crystallizer stage, a need to temporarily shut down the second stage for maintenance or the like, does not mean that the first stage has to be shut down too. The bleach from the first stage is of suitable commercial grade that with or without dilution, it can be diverted from the second stage and used elsewhere in the same facility, or else shipped to a remote facility.

While a presently preferred embodiment of the invention has been illustrated and described, it should be appreciated that principles of the invention are applicable to all embodiments that fall within the scope of the claims that follow hereinafter.

What is claimed is:

1. A method for the continuous manufacture, in a tank, of higher strength, low-salt, aqueous sodium hypochlorite bleach from lower strength aqueous sodium hypochlorite bleach that has some sodium hydroxide and is essentially free of sodium chloride (salt) crystals, the method comprising:

A) continuously introducing into an inner reaction zone circumscribed by a baffle i) that is inside a side wall of the tank for separating the inner reaction zone from an outer calming zone between the baffle and the side wall of the tank so as to avoid disturbing liquid in the calming zone, ii) that is open at its bottom to provide for both the inner reaction zone and the outer calming zone to be open to a bottom zone below both inner and outer zones, and iii) that is open at its top to a top wall of the tank,
1) the lower strength aqueous sodium hypochlorite bleach that has some sodium hydroxide and is essentially free of salt crystals,
2) aqueous sodium hydroxide solution having a concentration by weight within a range from about 45% to about 51%, and
3) chlorine in gas and/or liquid phase that may or may not include inerts, and
4) a recycle solution to create, by continuous reaction in the inner reaction zone, higher-strength bleach in which salt crystals are precipitating to continuously replenish a slurry in the bottom zone;

B) continuously withdrawing first and second portions of the slurry from the bottom zone, cooling the withdrawn first portion of the slurry, and re-introducing the cooled, withdrawn first portion of the slurry into the inner reaction zone as the recycle solution, while creating at the top of the calming zone, an essentially crystal-free mother liquor containing a weight percentage of sodium hypochlorite greater than that of the lower strength aqueous sodium hypochlorite bleach being introduced into the inner reaction zone; and C) separating substantially all salt crystals from the withdrawn second portion of the slurry and recovering the residual liquid as the higher-strength low-salt, aqueous sodium hypochlorite bleach.

2. A method as set forth in claim 1 wherein the step of cooling the withdrawn first portion of the slurry comprises flowing the withdrawn first portion of the slurry through a heat exchanger.

3. A method as set forth in claim 2 wherein the heat exchanger functions to transfer heat from the withdrawn first portion of the slurry to liquid coolant flowing through the heat exchanger.

4. A method as set forth in claim 3 wherein the temperature difference between liquid coolant flowing through the heat exchanger and the withdrawn first portion of the slurry flowing through the heat exchanger is controlled to a range extending from about 5° F. to about 15° F.

5. A method as set forth in claim 3 wherein the temperature difference between liquid coolant flowing through the heat exchanger and the withdrawn first portion of the slurry flowing through the heat exchanger is controlled to a range extending from about 2° F. to about 3° F.

6. A method as set forth in claim 3 wherein the cooling provided by the heat exchanger is controlled so as to cause the temperature of the withdrawn first portion of the slurry flowing through the heat exchanger to lose from about 1° F. to about 4° F., and preferably about 1° F. to about 2° F.

7. A method as set forth in claim 3 wherein the temperature of the withdrawn first portion of the slurry is controlled for allowing the use of cooling tower water to cool the withdrawn first portion of the slurry, and the heat exchanger functions to transfer heat from the withdrawn first portion of the slurry to cooling tower water flowing through the heat exchanger.

8. A method as set forth in claim 3 wherein the heat exchanger functions to transfer heat from the withdrawn first portion of the slurry to refrigerated water flowing through the heat exchanger.

9. A method as set forth in claim 1 wherein the lower strength aqueous sodium hypochlorite bleach that has some sodium hydroxide comprises at least about 15% by weight sodium hypochlorite and about 4.5% by weight sodium hydroxide.

10. A method as set forth in claim 9 wherein the aqueous product containing at least about 15% by weight sodium hypochlorite and about 4.5% by weight sodium hydroxide is manufactured by reacting
1) an aqueous solution that comprises sodium hydroxide in concentration greater than substantially 24 % by weight, and chlorine in gas and/or liquid phase that may or may not include inerts.

11. A method as set forth in claim 1 wherein the crystal-free mother liquor has greater than about 25% by weight sodium hypochlorite and less than about 9.5% by weight salt with slight excess of sodium hydroxide.

* * * * *